United States Patent [19]

Reese

[11] 4,169,607
[45] Oct. 2, 1979

[54] BEDDING PLANT TRANSPORT DEVICE

[76] Inventor: C. Harris Reese, Hallock, Minn.

[21] Appl. No.: 894,987

[22] Filed: Apr. 10, 1978

[51] Int. Cl.² .............................................. B62B 1/02
[52] U.S. Cl. ........................... 280/47.19; 280/47.37 R
[58] Field of Search .......... 280/47.19, 47.24, 47.37 R, 280/47.33, 654, 659, 43.1, 43.14, 43.24; 214/370

[56] References Cited

U.S. PATENT DOCUMENTS

| | | | |
|---|---|---|---|
| 907,923 | 12/1908 | Walsh | 280/47.19 |
| 1,021,880 | 4/1912 | Neble et al. | 214/370 |
| 2,453,246 | 11/1948 | Moksnes | 280/47.24 |
| 2,532,966 | 12/1950 | Thomas | 280/47.33 |
| 2,579,639 | 12/1951 | Adams | 280/47.19 |
| 2,597,765 | 5/1952 | Welburn | 280/47.24 |
| 2,745,675 | 5/1956 | Haynes | 280/47.24 |
| 3,138,265 | 6/1964 | Hansen | 214/370 |

FOREIGN PATENT DOCUMENTS 1284501  8/1972  United Kingdom ................. 280/47.19

*Primary Examiner*—David M. Mitchell
*Attorney, Agent, or Firm*—Merchant, Gould, Smith, Edell, Welter & Schmidt

[57] ABSTRACT

A device for transporting trays of bedding plants including a generally L-shaped main frame provided with a handle portion and a pair of horizontally spaced wheels rotatably mounted on the main frame. The device further includes a second frame rigidly mounted on the main frame, an article carrying frame suspendably mounted on the second frame, and a bottom support carriage connected to the article carrying frame for supporting the article carrying frame when the handle portion is moved upwardly to a resting position about an axis defined by the wheels. The main frame can be modified so that it is adjustable according to the height of the user. The article carrying frame can also be stabilized during transportation.

12 Claims, 8 Drawing Figures

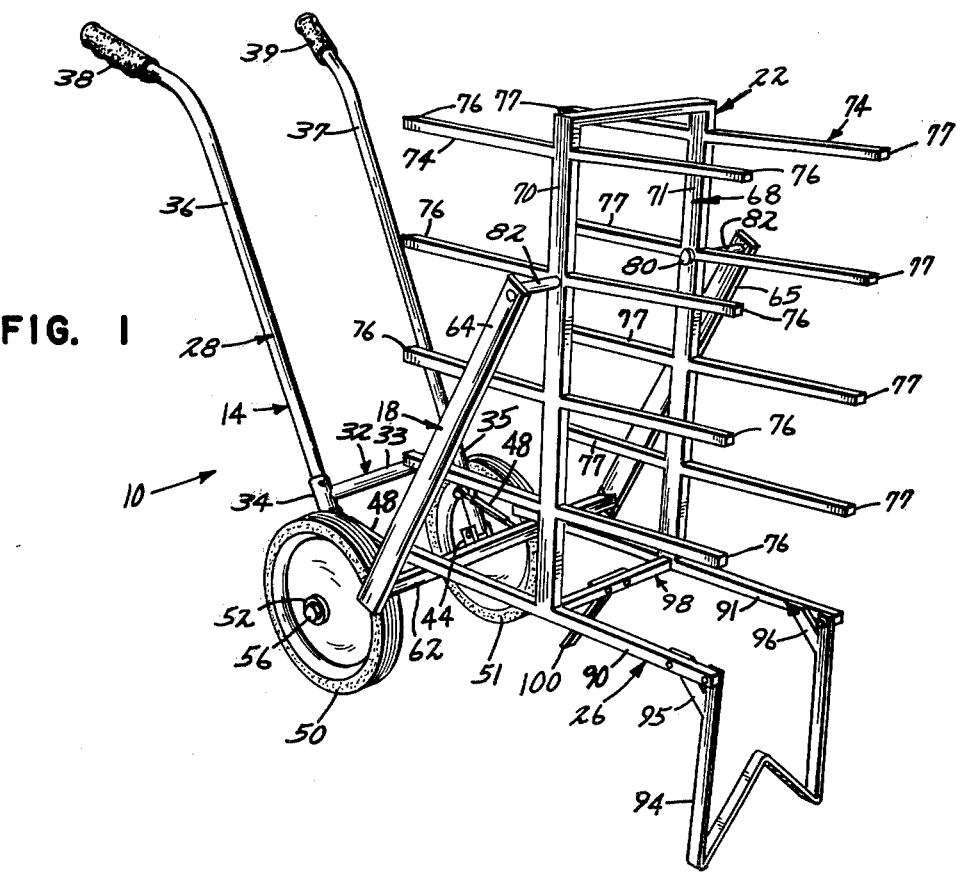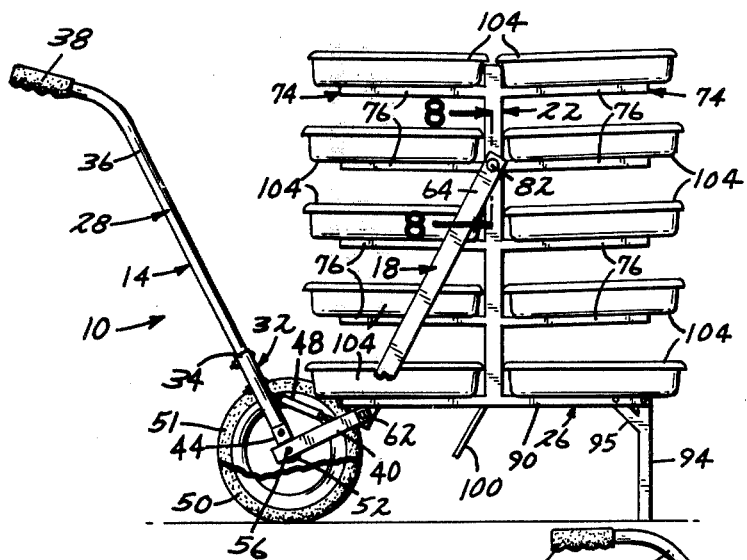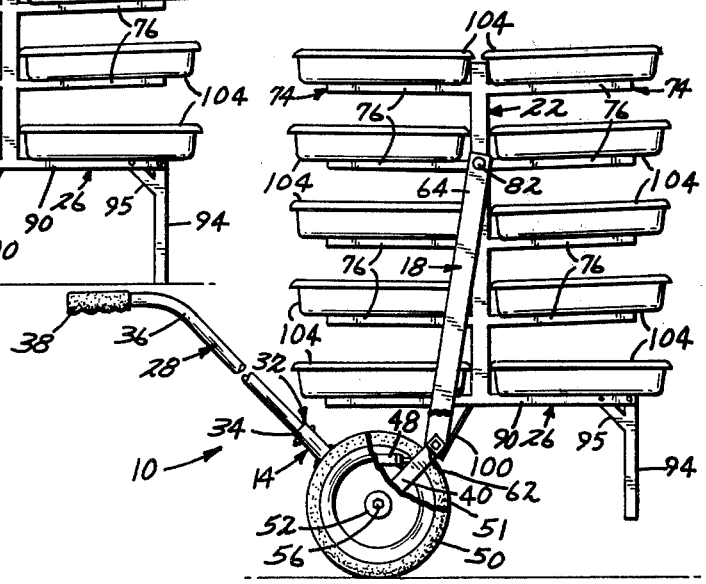

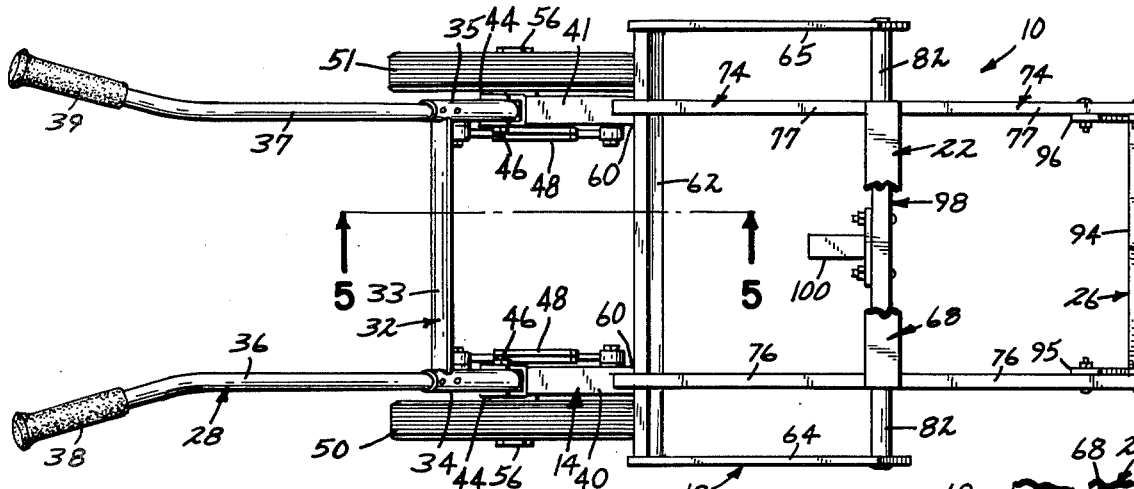

BEDDING PLANT TRANSPORT DEVICE

FIELD OF THE INVENTION

This invention relates to devices for carrying articles. In particular, this invention relates a new and useful device for transporting a plurality of trays or flats containing bedding plants.

BACKGROUND OF THE INVENTION

The economical and easy transportation of a plurality of articles which must be maintained substantially horizontal with respect to the ground presents unique problems. In the greenhouse industry in particular, the transportation of a plurality of trays of flowers or other bedding plants has been a time-consuming and back-breaking job. The trays must be maintained in a generally horizontal relationship to the ground in order to prevent the contents therein from being spilled out. The manual carrying of such trays to maintain them in a generally horizontal relationship to the ground is extremely impractical as well as very tiring if a number of such trays must be transported.

PRIOR ART

Several devices are known in the prior art for transporting articles in a substantially horizontal relationship with the ground. The patent to Neble et al., U.S. Pat. No. 1,021,880, issued Apr. 2, 1921, discloses a pallet truck including side bars 7 having handles 8 and yoke 9. The side bars are rotatably mounted on parallel arms 9' of yoke 9 by means of mountings 14. The pallet truck is also provided with an angular operating frame consisting of parallel guides or bars 28 and a connecting handle 29. Bars 28 are disposed within slots 24 formed in the upper face of cross bar 22 and are pivotally mounted at 30 to side members 15. To load or unload the articles, the operator elevates handle 8 so that members 15 will swing forwardly such that wheels 21 may rest upon the ground. The forward swinging movement of yoke 9 will be limited by handle 29 because bars 28 are of such a length that handle 29 will be disposed within recess 23 formed in crossbar 22 at the time the wheels 21 rest upon the ground. In order to transport the articles, side bars 7 are lowered so that platform 16 swings upwardly at a sufficient distance above the ground so that the truck can be moved in the normal manner.

There are a number of disadvantages in utilizing the Neble et al. pallet truck, especially to transport a plurality of articles such as trays containing bedding flowers. First, the Neble et al. pallet truck provides only one platform for carrying the articles. Second, the Neble et al. truck requires considerable movement of the two handles to move the platform between its loading or unloading position and its transporting position. Third, because handles 8 must be maintained in substantially a horizontal position when platform 16 is raised during transportation, an excessive amount of bending over is necessitated. Fourth, the sliding frame composed of bars 28 provides a very poor method for maintaining platform 16 in a stable position in its loading or unloading position and its transporting position.

Another device for transporting articles in a substantially horizontal relationship with respect to the ground is disclosed in the patent to Welburn, U.S. Pat. No. 2,597,765, issued May 20, 1952, in the form of a fork lift truck including a main U-shaped frame 12 having a crossbar 14 to which is connected a handle 18. Frame 12 further includes legs 16 attached at the ends of cross-bar 14 which receives a main axle 24 to rotatably mount wheels 26. Two supporting bars 32 are provided which are journaled so as to fit onto crossbar 14 and axle 24. A load engaging member 44 is positioned between bars 32 and is mounted for rotative movement about a pin 46. A second pin 48 is mounted between bars 42 and cooperates with a slot 50 formed in member 44 so as to limit the rotative movement of member 44 about pin 46.

As in the case of the Neble et al. pallet truck, the Welburn fork truck has a number of disadvantages. First, as in the case of the Neble et al. pallet truck, only one member is provided for transporting the articles. Second the ability of member 44 to maintain the articles in a substantially horizontal position is decreased due to the fact that member 44 can pivot to a certain extent about pin 46 during transportation of the articles. Third, the construction of the Welburn fork truck precludes articles being supported in a substantially horizontal relationship with respect to the ground when the fork truck is moved about axle 24 to a resting position. Fourth, as in the case of the Neble et al. pallet truck, the angular relationship between main frame 12 and bars 32 is substantially fixed so that the height of arm 18 relative to the person utilizing the fork truck cannot be varied according to how tall the person is.

SUMMARY OF THE INVENTION

Applicant has invented a new and useful device for transporting articles which overcomes the problems of the prior art devices. It includes a generally L-shaped main frame including an upwardly and rearwardly extending elongated handle portion and a bottom support portion connected to said handle portion. The device further includes a wheel rotatably mounted on the main frame at or near a juncture of the handle portion and the support portion for rotation about a generally horizontal axis, the handle portion being movable about the axis through an arc from a lower transporting position to a higher resting position. The device further includes a second frame rigidly mounted on the main frame at the free end of the support portion and extends generally upwardly therefrom. The device also includes an article carrying frame suspended from the second frame, the article carrying frame including a main portion and at least one article carrying member associated with the main portion to carry or support the articles. The device is further provided with a bottom support carriage including a bottom portion connected to the main portion of the article carrying frame and extending generally horizontally so as to rest on the second frame when the handle portion is moved to the resting position, and a ground-engaging member connected to the bottom portion and extending generally downwardly therefrom so as to provide further support for the article carrying frame when the handle portion is moved to the resting position. The present invention can conveniently and easily transport a plurality of articles in a substantially horizontal relationship with respect to the ground. The present invention has been found particularly useful in transporting a plurality of trays containing bedding plants which must generally be maintained in a horizontal relationship with respect to the ground to prevent the contents of the trays from being spilled out or damaged during the transportation thereof. The present invention is also self-standing in its resting position so that the trays of bedding plants can be loaded and unloaded with relative ease by one person. In addition, the present invention can be moved from its transporting to resting position or vice versa with a relatively modest amount of movement of the handle portion and without requiring substantial strength.

The present invention can also be modified so that the operator, regardless of his height, can comfortably push the device without excessively bending over to transport the articles. The present invention can also be constructed so the article carrying frame is stabilized during transportation. When so stabilized, the trays can be maintained generally horizontally with respect to the ground to prevent the bedding plants from being spilled out during transportation thereof.

BRIEF DESCRIPTION OF THE DRAWING

FIG. 1 is a view in perspective of a device according to the present invention;

FIG. 2 is a side elevational view to a smaller scale of a device according to the present invention in its resting position shown carrying trays of bedding plants;

FIG. 3 is a similar view of the device of FIG. 2 but in its transporting position;

FIG. 4 is a top plan view of a device according to the present invention;

FIG. 5 is an enlarged sectional view taken generally along line 5—5 of FIG. 4 showing the device carrying trays of bedding plants;

FIG. 6 is a view similar to the view in FIG. 5 but with the device in a transporting position;

FIG. 7 is an enlarged sectional view taken generally along line 7—7 of FIG. 5; and FIG. 8 is an enlarged sectional view taken generally along line 8—8 of FIG. 2.

DETAILED DESCRIPTION OF THE PREFERRED EMBODIMENT

Referring now to the drawing, FIG. 1 shows a device for transporting articles according to the present invention generally designated by the numeral 10. Device 10 includes a generally L-shaped main frame 14, a second frame 18 rigidly mounted on main frame 14, an article carrying frame 22 suspendably mounted on second frame 18 and a bottom support carriage 26 connected to article frame 22.

As shown in FIG. 4, main frame 14 includes an elongated upwardly and rearwardly extending handle portion generally designated by the numeral 28. Portion 28 includes a generally C-shaped mounting element 32 which has a cross brace 33 which connects horizontally spaced end members 34 and 35. End members 34 and 35 receive and secure one end of a pair of horizontally spaced elongated handles 36 and 37 which extend generally upwardly and rearwardly to hand grips 38 and 39. While mounting element 32 is shown as a separate element in the preferred embodiment, it is within the scope of the present invention to make end members 34 and 35 further extension of handles 36 and 37 with cross brace 33 being connected to the handles by suitable means such as welding.

Main frame 14 further includes a bottom support portion in the form of horizontally spaced bottom support bars 40 and 41. As shown in FIGS. 5 and 7, each of the support bars is provided at its rear end with a U-shaped mounting bracket 44 for pivotal connection of the support bar to the bottom end of one of the end members 34, 35 of mounting element 32. Suitable means in the form of nut-bolt combinations 46 are used for pivotally securing the U-shaped bracket 44 to the end member 34 or 35. In order to limit or prevent pivotal movement of the mounting element 32 about the axis defined by nut-bolt combination 46, an adjustable turnbuckle 48 is provided on each side, having one end connected to the mounting element 32 while the other end is connected to the support bar 40 or 41. The turnbuckle 48 keeps the mounting element 32 from pivoting about the axis defined by nut-bolt combinations 46 so as to maintain a fixed angular relationship between the bottom support bars 40 and 41 and mounting element 32. Because turnbuckles 48 are adjustable, this angular relationship between the bottom support bars and the mounting element can be varied where desirable.

As shown in FIG. 4, a pair of horizontally spaced wheels 50 and 51 are provided which are rotatably mounted on main frame 14. Each of the wheels has a hub 52 which is rotatably mounted on support bar 40 or 41 at or near the juncture of the mounting element 32 and support bar 40 or 41 by means of a shoulder bolt 56. A portion of the shoulder bolt 56 and the center of the hub together form a bearing so that the wheels rotate about a generally horizontal axis.

As shown in FIGS. 1, 4 and 5, second frame 18 includes a generally horizontal base bar 62 which is fixedly mounted on the free end of the bottom support bars 40, 41 as generally indicated at numeral 60. Base bar 62 extends generally transversely across bottom support bars 40 and 41 and has opposite ends which extend generally outwardly therebeyond. Frame 18 further includes horizontally spaced elongated arms 64 and 65 which have one end fixedly mounted on each end of base bar 62 and which extend generally upwardly and forwardly therefrom, perpendicular thereto.

Referring now to FIG. 1, article frame 22 includes a generally U-shaped vertically extending planar main portion 68 which has a pair of horizontally spaced elongated side members 70 and 71 and a plurality of vertically spaced article carrying members in the form of racks 74 which extend outwardly from side members 70 and 71 on either side of main portion 68. Each of the racks 74 includes a pair of horizontally spaced bars 76 and 77 which extend generally perpendicularly from side members 70 and 71.

As shown in FIGS. 1 and 8, main portion 68 is suspendably mounted on the upwardly extending ends of arms 64 and 65 by pivotally securing side members 70 and 71 by suitable means in the form of a pair of bolts 80 secured within bores 81 formed in a pair of pins 82 fixedly secured to the upwardly extending end of each of the arms 64 and 65. Thus, article frame 22 freely and pivotally swings between arms 64 and 65.

Referring now to FIG. 1, support carriage 26 includes a generally horizontal bottom portion in the form of horizontally spaced elongated bottom bars 90 and 91. The bottom end of main portion 68 is connected generally perpendicularly to the bottom bars 90 and 91 between first and second ends thereof. A generally W-shaped ground engaging member 94 is connected to one end of each of the bottom bars 90 and 91 and extends generally vertically and downwardly therefrom. In order to provide additional structural strength, braces 95 and 96 can be provided which are connected to bottom bars 90 and 91 and the ground engaging member 94.

As shown in FIGS. 1 and 4, device 10 can be provided with a stop member generally indicated by the numeral 98 which is connected to bottom bars 90 and 91 at the bottom end of main portion 68. Member 98 includes a downwardly and rearwardly extending tongue 100.

OPERATION

Referring in particular to FIGS. 2 and 3, a plurality of articles to be carried such as bedding plants in trays or flats 104 are positioned on racks 74. Also, trays 104 can be positioned on bottom bars 90 and 91 if desirable. Trays 104 are preferably positioned on either side of main portion 68 so as to balance article frame 22 against excessive sway.

FIG. 2 shows device 10 in its resting position. As shown in FIGS. 2 and 5, one end of each of bottom bars 90 and 91 rest on base bar 62. When device 10 is in the resting position, ground-engaging member 94 is in contact with the ground so as to provide further support to article frame 22. As can be seen in FIG. 2, trays 104 remain generally horizontal with respect to the ground.

FIG. 3 shows device 10 in its transporting position. By moving the handle portion downwardly, article frame 22 swings upwardly between arms 64 and 65. If trays 104 are positioned in a balanced fashion, rack 74 will remain generally horizontal with respect to the ground so that trays 104 will remain securely positioned thereon. When the handles are finally moved to the transporting position, tongue 100 engages base bar 62 so as to prevent article frame 22 from swinging further rearwardly between arms 64 and 65. Thus, article frame 22 remains in a secure and stable position during transporation of trays 104.

So that the user can comfortably push device 10 or move the handles downwardly to the transporting position, the angular relationship between the handle portion and the bottom support bars 40 and 41 can be varied by adjusting turnbuckle 48. As the height of the person increases, the angular relationship between the handle portion and bottom support bars 40 and 41 should be decreased so that the person pushing device 10 does not have to excessively bend over. In contrast, as the height of the person decreases, the angular relationship between the handle portion and bottom support bars 40 and 41 should be increased so that a shorter person can more easily move the handles downwardly for transporting the articles.

I claim:

1. A device for transporting articles, comprising:
   a generally L-shaped main frame including an upwardly and rearwardly extending elongated handle portion and a bottom support portion connected to said handle portion and having a free end;
   wheel means rotatably mounted on said main frame near a juncture of said handle portion and said support portion for rotation about a generally horizontal axis, said handle portion being movable about said axis through an arc between a lower transporting position and a higher resting position;
   a second frame rigidly mounted on said main frame at said free end of said support portion and extending generally upwardly therefrom, said second frame including carriage support means adjacent said free end;
   an article carrying frame suspended from said second frame, said article carrying frame including a main portion having a top and a bottom end, and at least one article carrying member associated with said main portion to support the articles; and
   a bottom support carriage including a bottom portion connected to said main portion of said article carrying frame and extending generally horizontally so as to rest on said carriage support means when said handle portion is moved to said resting position, and a ground engaging member connected to said bottom portion and extending generally downwardly therefrom so as to provide further support for said article carrying frame when said handle portion is moved to said resting position.

2. A device according to claim 1 wherein said handle portion is pivotally connected to said support portion for movement about a second generally horizontal axis and wherein the device further comprises adjustable means for locking said handle portion relative to said support portion.

3. A device according to claim 2 wherein said lock means comprises an adjustable turnbuckle having a first end connected to said handle portion and a second end connected to said support portion.

4. A device according to claim 1 wherein said carriage support means comprises a horizontal base bar mounted transversely on said free end of said support portion and wherein said second frame further comprises a pair of horizontally spaced upwardly and forwardly extending elongated arms having first ends rigidly connected to said base bar, said main portion of said article carrying frame being pivotally mounted between second ends of said arms.

5. A device according to claim 4 wherein said bottom portion of said support carriage is elongated, said main portion of said article carrying frame being connected to said bottom portion intermediate first and second ends thereof, said first end of said bottom portion resting on said base bar when said handle portion is moved to said resting position and is suspended above said base bar when said handle portion is moved to said transporting position, said ground engaging member being connected to said bottom portion at said second end thereof.

6. A device according to claim 1 wherein said bottom portion comprises a pair of horizontally spaced bottom bars and wherein said ground engaging member is generally W-shaped.

7. A device according to claim 1 wherein said at least one article carrying member comprises a plurality of generally vertically spaced racks connected to and extending generally outwardly from said main portion of said article carrying frame.

8. A device according to claim 7 wherein each of said racks comprises a pair of horizontally spaced bars extending generally perpendicularly from said main portion of said article carrying frame.

9. A device according to claim 1 further comprising means associated with one of said article carrying frame and said bottom support carriage for engaging said second frame when said handle portion has moved to said transporting position to stabilize said article carrying frame.

10. A device for transporting articles, comprising:
    a generally L-shaped main frame including a pair of horizontally spaced upwardly and rearwardly extending elongated handles, a generally C-shaped mounting element connected to one end of each of said handles, and a pair of horizontally spaced bottom support bars connected to said mounting element, each of said support bars having a free end;

a pair of horizontally spaced wheels, said wheels being rotatably mounted on said main frame near junctures of said mounting element and said support bars for rotation about a generally horizontal axis, said handles being movable about said axis through an arc from a lower transporting position to a higher resting position;

a second frame rigidly connected to said main frame, said second frame including a generally horizontal base bar transversely mounted on said free ends of said support bars, and a pair of horizontally spaced elongated arms, each of said arms having first and second spaced ends, said first ends of said arms being fixedly mounted on opposite ends of said base bar, said arms extending generally upwardly and forwardly therefrom, perpendicularly thereto;

an article carrying frame suspended from said arms, said frame including a main portion having top and bottom ends and first and second opposite side members, and a plurality of vertically spaced racks connected to said main portion and extending generally perpendicularly from each of said side members to carry the articles, said main portion being pivotally mounted between said arms at said second ends thereof; and a bottom support carriage including a pair of horizontally spaced elongated bottom bars, said bottom end of said main portion being connected to said bottom bars intermediate first and second ends thereof generally perpendicularly thereto so that said first ends of said bottom bars rest on said base bar when said handles are moved to said resting position and are suspended above said base bar when said handles are moved to said transporting position, and a ground engaging member connected to said second ends of said bottom bars and extending generally downwardly therefrom to provide further support to said article carrying frame when said handles are moved to said resting position.

11. A device according to claim 10 including a stop member connected to said bottom bars at said bottom end of said main portion of said article carrying frame, said stop member including a downwardly and rearwardly extending tongue to engage said base bar when said handles are moved to said transporting position to stabilize said article carrying frame during transportation thereof.

12. A cart, comprising:
a main frame including an upwardly extending handle portion and a bottom support portion angularly spaced therefrom, said support portion having a free end;

wheel means rotatably mounted on said main frame near a juncture of said handle portion and said bottom support portion for rotation about a generally horizontal axis, said handle portion being pivotable about said axis through an arc between a transporting position and a resting position;

a second frame rigidly mounted on said support portion proximate said free end and extending generally upwardly therefrom;

an article carrying frame suspended from said second frame; and means associated said article carrying frame for supporting said article carrying frame when said handle portion is moved to said resting position.

* * * * *